United States Patent
Azuma

(12) 
(10) Patent No.: US 6,597,747 B1
(45) Date of Patent: Jul. 22, 2003

(54) BASEBAND SIGNAL PROCESSING CIRCUIT CAPABLE OF ACCURATELY SETTING PHASE DIFFERENCE BETWEEN ANALOG I SIGNAL AND ANALOG Q SIGNAL TO 90 DEGREES

(75) Inventor: Toshiyuki Azuma, Kanagawa-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/420,369

(22) Filed: Oct. 18, 1999

(30) Foreign Application Priority Data

Oct. 19, 1998 (JP) .......................... 10-296976

(51) Int. Cl.⁷ .............................. H04L 27/36
(52) U.S. Cl. ...................... 375/298; 327/238
(58) Field of Search ................. 375/216, 298, 375/302, 308, 146; 332/103; 327/238

(56) References Cited

U.S. PATENT DOCUMENTS

| | | | | |
|---|---|---|---|---|
| 5,387,883 A | * | 2/1995 | Ueda | 332/103 |
| 5,396,296 A | * | 3/1995 | Gallagher | 348/565 |
| 5,548,253 A | | 8/1996 | Durrant | |
| 5,886,584 A | * | 3/1999 | Tanai et al. | 332/103 |
| 5,896,053 A | * | 4/1999 | Prentice | 327/175 |
| 5,930,689 A | * | 7/1999 | Wilhite et al. | 327/238 |
| 6,198,777 B1 | * | 3/2001 | Feher | 375/295 |

* cited by examiner

Primary Examiner—Stephen Chin
Assistant Examiner—David B. Lugo
(74) Attorney, Agent, or Firm—Brinks Hofer Gilson & Lione

(57) ABSTRACT

The time interval between the rise time or fall time of a first clock signal which is used to convert a digital signal into an analog signal and the rise time or fall time of a second clock signal which is used to convert the digital signal into an analog signal can be changed.

1 Claim, 2 Drawing Sheets

BASEBAND SIGNAL PROCESSING CIRCUIT CAPABLE OF ACCURATELY SETTING PHASE DIFFERENCE BETWEEN ANALOG I SIGNAL AND ANALOG Q SIGNAL TO 90 DEGREES

BACKGROUND OF THE INVENTION

1. Field of the Invention

The present invention relates to a baseband signal processing circuit for processing a baseband signal for digital modulating a carrier wave.

2. Related Background Art

In transmission of a portable telephone in the CDMA system, each of a voice signal and various control signals is converted by a diffusion signal into a digital signal, the digital signal is converted into an analog signal, and a carrier wave is digital modulated (QPSK modulated).

A conventional baseband signal processing circuit will be described with reference to FIG. 4.

First, a voice signal or the like is converted into a digital signal D by a digital processing circuit 31. The digital signal D is outputted and supplied to both of a first D/A converter 32 and a second D/A converter 33. The digital signal D consists of eight bits.

The digital processing circuit 31 outputs a first clock signal C/I and a second clock signal C/Q. The first clock signal C/I is supplied to the first D/A converter 32 and the second clock signal C/Q is supplied to the second D/A converter 33. Each of the first and second clock signals C/I and C/Q is used to convert the digital signal D into an analog signal. The duty ratio of each of the clock signals is 50%. The first and second clock signals C/I and C/Q are in synchronization with each other and have opposite phases.

In the first D/A converter 32, the digital signal D is converted into an analog signal at the rising edge of the first clock signal C/I. In the second D/A converter 33, the digital signal D is converted into an analog signal at the rising edge of the second clock signal C/Q.

As a result, the first D/A converter 32 outputs an analog I signal A/I serving as a first baseband signal. The second D/A converter 33 outputs an analog Q signal A/Q serving as a second baseband signal. The phase of the analog I signal A/I and that of the analog Q signal A/Q are different from each other at 90 degrees.

Each of the analog I signal A/I and the analog Q signal A/Q has a frequency band of about 630 kHz. In order to cut noises at frequencies higher than that, the analog I signal A/I and the analog Q signal A/Q are supplied to a first low-pass filter 34 and a second low-pass filter 35, respectively. In order to reduce the size of the portable telephone, each of the first and second low-pass filters 34 and 35 takes the form of an active low-pass filter which can be formed in an IC. The analog I signal A/I in which noises at 630 kHz or higher are cut is amplified by a first baseband signal amplifier 36 and then supplied to a first modulator 38. Similarly, the analog Q signal A/Q in which noises at 630 kHz or higher are cut is amplified by a second baseband signal amplifier 37 and then supplied to a second modulator 39. Each of the first and second baseband signal amplifiers 36 and 37 takes the form of an operational amplifier.

In order to set each of the level of the analog I signal A/I to be supplied to the first modulator 38 and the level of the analog Q signal A/Q to be supplied to the second modulator 39 to a predetermined level (for example, 1 volt), the amplification degree of each of the first and second baseband signal amplifiers 36 and 37 can be changed.

A first carrier wave Φ/I is supplied to the first modulator 38 and a second carrier wave Φ/Q is supplied to the second modulator 39. The phase of the first carrier waved Φ/I and that of the second carrier wave Φ/Q are different from each other by 90 degrees. The first and second carrier waves Φ/I and Φ/Q are obtained by a phase shifter 41 on the basis of an original carrier wave (its frequency is about 130 MHz) outputted from a carrier oscillator 40.

The first carrier waves Φ/I is PSK modulated by the analog I signal A/I and the second carrier wave Φ/Q is PSK modulated by the analog Q signal A/Q. The PSK modulated two signals are added by an adder 42, thereby obtaining a signal which has been QPSK modulated as a whole. The resultant signal is frequency converted to a transmission signal of about 800 MHz to 900 MHz by a frequency converter (not shown), further, a predetermined process is performed, and a resultant signal is transmitted from an antenna (not shown) to a base station.

In the conventional baseband signal processing circuit described above, the phase difference between the analog I signal outputted from the first D/A converter 32 and the analog Q signal outputted from the second D/A converter 33 is set to 90 degrees. It happens, however, that the phase of the first clock signal C/I or second clock signal C/Q is deviated or the phase difference between the analog I signal A/I and the analog Q signal A/Q is deviated from 90 degrees due to a phase error (for example, due to different phase characteristics of the low-pass filters 34 and 35) in the transmission paths from the low-pass filters 34 and 35 to the adder 42.

In a state where the phase difference between the analog I signal A/I and the analog Q signal A/Q is deviated from 90 degrees, the first and second carrier waves Φ1 and Φ2 are PSK modulated. As a result, the reception sensitivity on the reception side deteriorates, a bit error occurs at the time of demodulation on the reception side, and a problem such that a signal cannot be normally transmitted and received arises.

SUMMARY OF THE INVENTION

It is therefore an object of the invention to provide a baseband signal processing circuit capable of accurately setting the phase difference between an analog I signal A/I serving as a first baseband signal and an analog Q signal A/Q serving as a second baseband signal to 90 degrees.

In order to achieve the object, there is provided a baseband signal processing circuit of the invention comprising: a first D/A converter for receiving a digital signal and a first clock signal which is used to convert the digital signal into an analog signal and outputting a first baseband signal; and a second D/A converter for receiving the digital signal and a second clock signal which is used to convert the digital signal into an analog signal and outputting a second baseband signal, wherein the first and second clock signals are synchronized with each other and a time interval between rise time or fall time of the first clock signal and rise time or fall time of the second clock signal is changeable.

According to the baseband signal processing circuit of the invention, the duty ratio of either the first clock signal or the second clock signal is changeable.

According to the baseband signal processing circuit of the invention, the digital signal, the first clock signal, and the second clock signal are outputted from a digital processing circuit, a duty adjusting circuit is provided either between the digital processing circuit and the first D/A converter or between the digital processing circuit and the second D/A converter, and the first clock signal or the second clock signal is supplied to the first D/A converter or the second D/A converter via the duty adjusting circuit.

There is also provided a baseband signal processing circuit of the invention comprising: a first D/A converter for receiving a digital signal and a first clock signal which is used to convert the digital signal into an analog signal and outputting a first baseband signal; and a second D/A converter for receiving the digital signal and a second clock signal which is used to convert the digital signal into an analog signal and outputting a second baseband signal, wherein the first and second clock signals are synchronized with each other and the phase difference between the first clock signal and the second clock can be changed.

DETAILED DESCRIPTION OF THE PREFERRED EMBODIMENT

Figure 1:
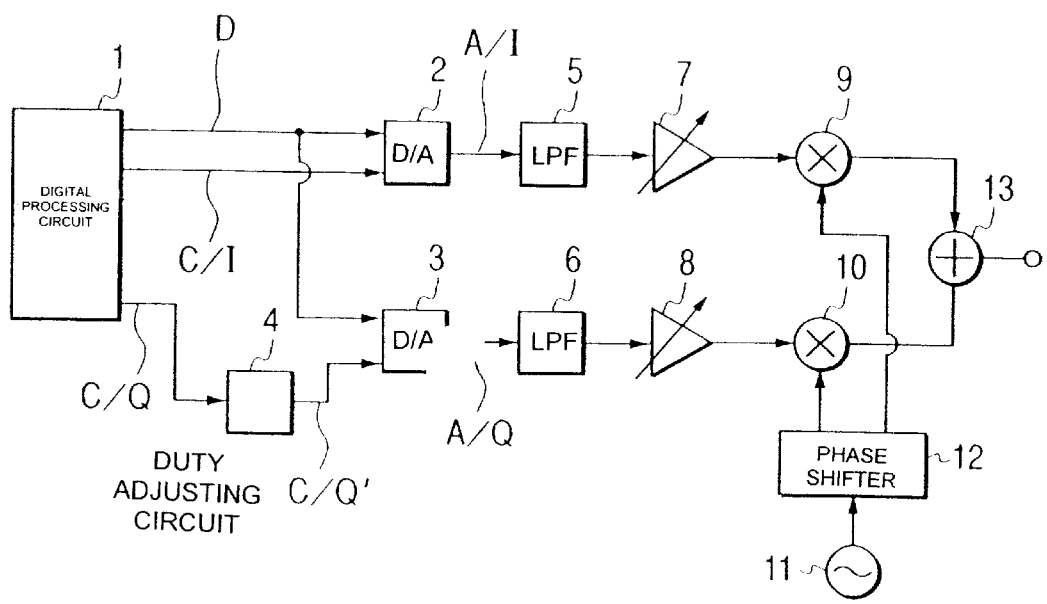
FIG. 1 is a circuit diagram for explaining a baseband signal processing circuit of the invention.
Figure 2:
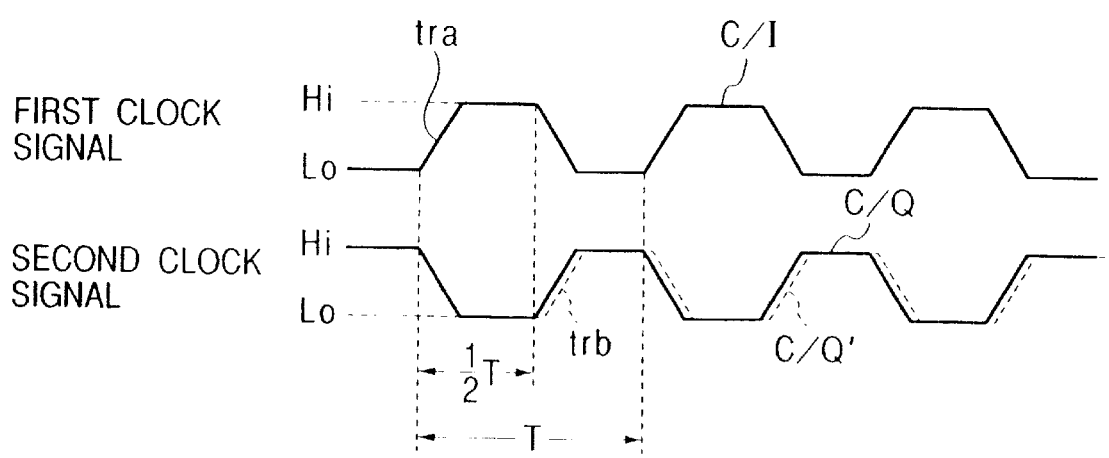
FIG. 2 is a timing chart of clock signals for explaining D/A conversion.
Figure 3:
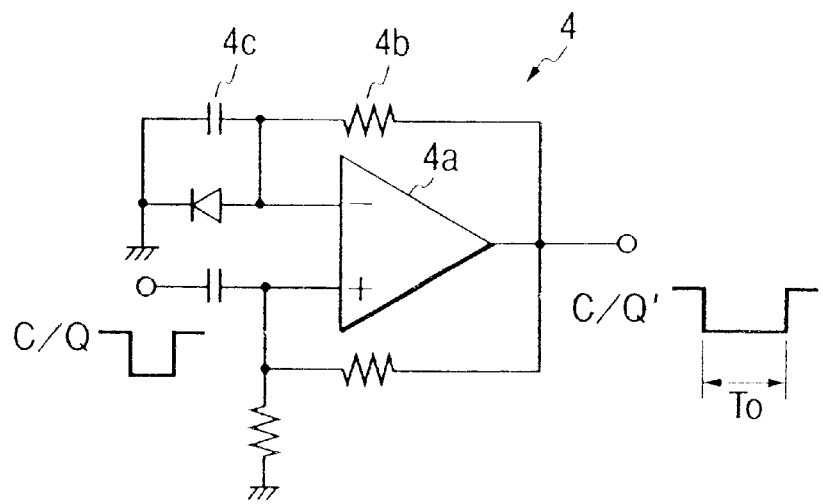
FIG. 3 is a circuit diagram of a duty adjusting circuit used for the baseband signal processing circuit of the invention.
Figure 4:
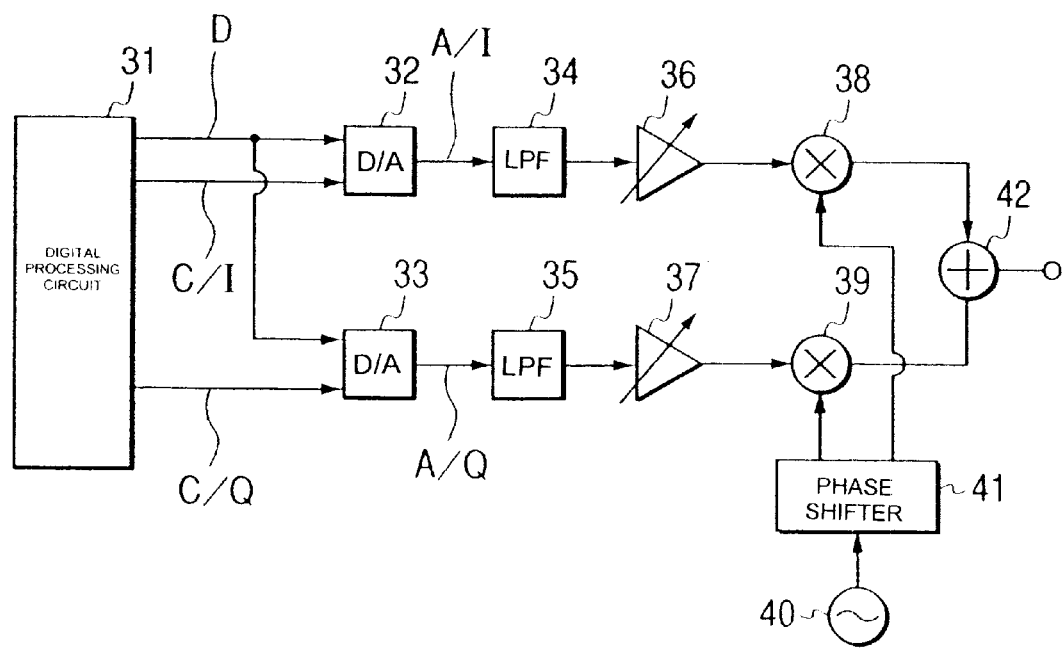
FIG. 4 is a circuit diagram for explaining a conventional baseband signal processing circuit.

A baseband signal processing circuit of the invention will be described with reference to FIGS. 1 to 3. FIG. 1 is a circuit diagram for explaining the baseband signal processing circuit of the invention. FIG. 2 is a timing chart of clock signals for explaining D/A conversion. FIG. 3 is a circuit diagram of a duty adjusting circuit used for the base band signal processing circuit of the invention.

First, in FIG. 1, a voice signal or the like is converted to a digital signal D by a diffusion signal in a digital processing circuit 1. The digital signal D is supplied to both of a first D/A converter 2 and a second D/A converter 3. The digital signal D consists of eight bits.

The digital processing circuit 1 also outputs a first clock signal C/I and a second clock signal C/Q. The first and second clock signals C/I and C/Q are used to convert the digital signal D into an analog signal. As illustrated in FIG. 2, the duty ratio of each of the clock signals is 50%. The first and second clock signals are in synchronization with each other and have opposite phases. The first clock signal C/I is supplied to the first D/A converter 2. The second clock signal C/Q is supplied to the second D/A converter 3 via a duty adjusting circuit 4.

In the first D/A converter 2, the digital signal D is converted into an analog signal at the rising edge tra of the first clock signal C/I. In the second D/A converter 3, the digital signal D is converted into an analog signal at the rising edge trb of a second clock signal C/Q' transmitted via the duty adjusting circuit 4.

As a result, the first D/A converter 2 outputs the analog I signal A/I as a first baseband signal and the second D/A converter 3 outputs the analog Q signal A/Q as a second baseband signal. The analog I signal A/I and the analog Q signal A/Q have the phase difference of 90 degrees from each other.

For example, as shown in FIG. 3, the duty adjusting circuit 4 is constructed by using an operational amplifier 4a. The output level goes low at the falling edge of the second clock signal C/Q supplied to the non-inverting input terminal (+), and the output level goes high after the elapse of a metastable period T0 irrespective of the rising edge of the second clock signal C/Q. The metastable period T0 is proportional to a time constant of a feedback resistor 4b and a charging capacitor 4c. The rise time trb (refer to FIG. 2) of the second clock signal C/Q' outputted from the duty adjusting circuit 4 can be therefore adjusted by the feedback resistor 4b or charging capacitor 4c.

If the phase difference between the analog I signal A/I and the analog Q signal A/Q is not 90 degrees, the value of resistance of the feedback resistor 4b in the duty adjusting circuit 4 or the like is adjusted, thereby enabling the phase difference between the two analog signals A/I and A/Q to be accurately adjusted to 90 degrees.

Each of the analog I signal A/I and the analog Q signal A/Q has a frequency band of about 630 kHz. In order to cut noises at frequencies higher than that, the analog signals A/I and A/Q are supplied to a first low-pass filter 5 and a second low-pass filter 6, respectively. In order to reduce the size of a portable telephone, each of the first and second low-pass filters 5 and 6 takes the form of an active low-pass filter which can be formed in an IC. The analog I signal A/I in which noises at 630 kHz or higher are cut is amplified by a first baseband signal amplifier 7 and then supplied to a first modulator 9. Similarly, the analog Q signal A/Q in which noises at 630 kHz or higher are cut is amplified by a second baseband signal amplifier 8 and then supplied to a second modulator 10. Each of the first and second baseband signal amplifiers 7 and 8 takes the form of an operational amplifier.

In order to set the level of each of the analog I signal A/I to be supplied to the first modulator 9 and the analog Q signal A/Q to be supplied to the second modulator 10 to a predetermined level (for example, 1 volt), the amplification degree of each of the first and second baseband signal amplifiers 7 and 8 is changed.

A first carrier waves Φ/I is supplied to the first modulator 9 and a second carrier wave Φ/Q is supplied to the second modulator 10. The phase of the first carrier waves Φ/I and that of the second carrier wave Φ/Q are different from each other by 90 degrees and are obtained by a phase shifter 12 on the basis of an original carrier wave (its frequency is about 130 MHz) outputted from a carrier oscillator 11.

The first carrier waves Φ/I is PSK modulated by the analog I signal A/I and the second carrier wave Φ/Q is PSK modulated by the analog Q signal A/Q. The PSK modulated two signals are added by an adder 13, thereby obtaining a signal which has been QPSK modulated as a whole. The resultant signal is frequency converted to a transmission signal of about 800 MHz to 900 MHz by a frequency converter (not shown), further, a predetermined process is performed, and a resultant signal is transmitted from an antenna (not shown) to a base station.

Although the two clock signals of the first and second clock signals C/I and C/Q are used and the duty ratio of one of the signals is changed in the above description, the phase relation between the signals may be also changed without changing the duty ratio. In short, it is sufficient that a time interval between a timing (time) at which the digital signal is converted into the analog signal of the first baseband signal and a timing (time) at which the digital signal is converted into the analog signal of the second baseband signal can be changed.

In the above description, the digital signal D is converted into the analog signals by using the two clock signals of the first clock signal C/I and the second clock signal C/Q' based on the second clock signal C/Q at the rising edges of the clock signals. It is also possible to use only a common clock signal, for example, the first clock signal C/I, obtain the first baseband signal by converting the digital signal into an analog signal at the rising edge of the first clock signal C/I, and obtain the second baseband signal by converting the digital signal into an analog signal at the falling edge of the clock signal. It is sufficient to adjust one of the rise time or fall time by the duty adjusting circuit 4.

As described above, in the baseband signal processing circuit of the invention, a time interval between the rise time or fall time of the first clock signal which is used to convert a digital signal into an analog signal and the rise time or fall time of the second clock signal which is used to convert a digital signal into an analog signal is changeable. Consequently, the phase difference between the two analog signals serving as the baseband signals can be accurately set to 90 degrees.

According to the baseband signal processing circuit of the invention, since the duty ratio of either the first clock signal or the second clock signal is changeable, the time interval between the rise time or fall time of the first clock signal and the rise time or fall time of the second clock signal can be easily changed.

In the baseband signal processing circuit of the invention, the duty adjusting circuit is provided either between the digital processing circuit and the first D/A converter or between the digital processing circuit and the second D/A converter, and the first clock signal or the second clock signal is supplied to the first D/A converter or the second D/A converter via the duty adjusting circuit. Consequently, the duty ratio of one of the clock signals is changed and the rise time or fall time can be changed.

According to the baseband signal processing circuit of the invention, the phase difference between the first clock signal which is used to convert a digital signal into an analog signal and the second clock signal which is used to convert the digital signal into an analog signal can be changed. Thus, the internal between times at which the digital signal is converted into an analog signal can be adjusted.

What is claimed is:

1. A baseband signal processing circuit comprising:
   a first D/A converter for receiving a digital signal and a first clock signal which is used to convert the digital signal into an analog signal and outputting a first baseband signal; and
   a second D/A converter for receiving the digital signal and a second clock signal which is used to convert the digital signal into an analog signal and outputting a second baseband signal,
   wherein the first and second clock signals are synchronized with each other and a time interval between rise time or fall time of the first clock signal and rise time or fall time of the second clock signal is changeable, and
   wherein the digital signal, the first clock signal, and the second clock signal are outputted from a digital processing circuit, a duty adjusting circuit is provided either between the digital processing circuit and the first D/A converter or between the digital processing circuit and the second D/A converter, and the first clock signal or the second clock signal is supplied to the first D/A converter or the second D/A converter via the duty adjusting circuit.

* * * * *